United States Patent Office

3,287,037
Patented Nov. 22, 1966

3,287,037
CONTACT DEVICES
Karl Joel Aversten, Lidingo, Sweden, assignor to AGA Aktiebolag, Lidingo, Sweden, a corporation of Sweden
Filed Dec. 17, 1964, Ser. No. 418,967
Claims priority, application Sweden, Jan. 10, 1964, 264/64
3 Claims. (Cl. 287—20.2)

The present invention relates to electrical contact devices. More particularly, the present invention relates to contact devices having at least one contact shoe which is soldered to a metallic surface by means of an aperture having inserted therein a metal stud provided with a cylinder of solder metal at its end adjacent the surface to which the contact is to be secured. This type of contact is secured to a metal surface by creating an electric arc between the solder metal of the stud and the metallic surface. The arc is utilized not only for melting the solder metal in the aperture of the cable shoe but also for heating the portions of the shoe nearest to the arc as well as the metallic surface. In this manner, the solder metal provides a solid joint between these parts and the metal stud when the latter has been forced into the solder metal in the aperture and the solder metal has been allowed to solidify. A contact device of this type and the attachment thereof is described in the U.S. patent specification 2,711,915.

In order to provide an effective soldered joint, the soldering surfaces to which the solder metal should adhere after having solidified must have a temperature substantially higher (for instance 200° C. higher) than the melting temperature of the solder metal. It is therefore customary to preheat the soldering surfaces with the aid of a separate heat source before applying the molten solder metal to the surfaces. However, such preheating should not take place in connection with the attachment of the contact devices but all heating should be obtained in connection with sustaining the electric arc. The electric arc must be maintained during the time required for all of the solder metal on the stud to melt off, because the quality of the solder connection is impaired if the metal stud itself melts as may occur if the melting interval is too long. The quality of the joint may also be poor if unmelted solder remains in the joint as will occur if the melting interval is too short. However, the melting of all of the solder metal must also be consistent with the application of such an amount of heat as to cause the soldering surfaces to reach the required temperature. Therefore, up to now, the required quality of contact device was obtained only after a series of tests, but without there being any precise knowledge as to the limits of dimensions of the contact devices of this type. This is probably the reason why some soldered connections in practical applications have proved to have unsatisfactory strength and even occasional failures have occurred.

It is an object of the present invention to provide a contact device which is free from the foregoing disadvantages. This and other objects are achieved according to the present invention by proportioning the contact shoe relative to the cross-section, height and melting point of the solder metal provided on the metal stud. More precisely, the contact shoe should be proportioned to have a volume according to a formula to be stated below.

The invention will be explained with reference to an embodiment shown on the attached drawing wherein like numerals refer to like parts and wherein.

Figure 1:
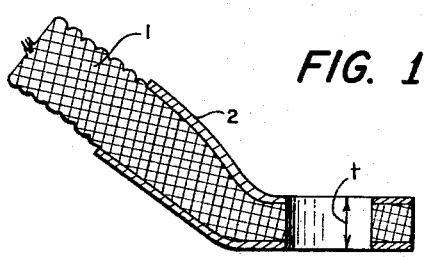
FIG. 1 is a vertical longitudinal section through a portion of a contact device.
Figure 2:
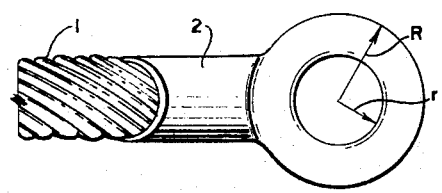
FIG. 2 is a plan view of the device.
Figure 3:
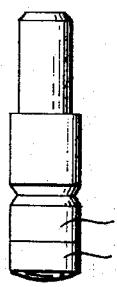
FIG. 3 is a lateral view of a solder metal stud.
Figure 4:
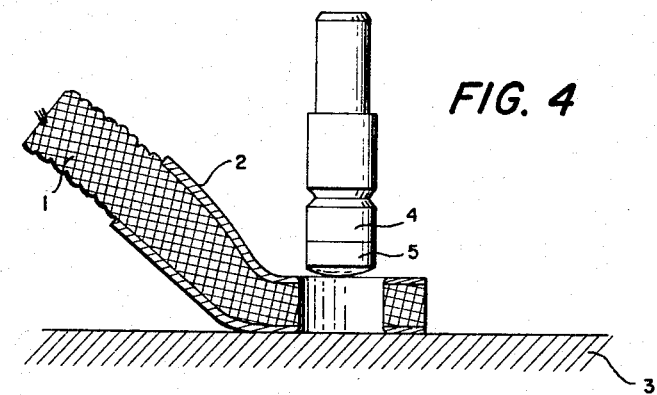
FIG. 4 is a similar section to FIG. 1 but with the stud in its position at the start of the melting off process.
Figure 5:
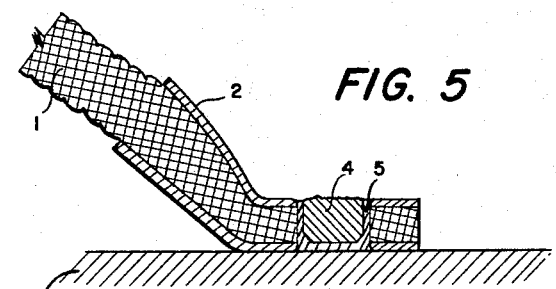
FIG. 5 is a similar section as FIG. 4 when the contact device has been attached.

The drawings show a cable 1 and a contact shoe 2 of metal, e.g. copper, which is to be soldered to a metallic surface such as a rail 3, as seen in FIGS. 4 and 5. The cable shoe 2 has an outer radius R and an aperture of radius r and a thickness t, so that the volume W thereof is $\pi(R^2-r^2)(t)$ The solder metal stud shown in FIG. 3 comprises a metal stud 4 of, e.g., brass and a cylinder of soldering composition 5 which may comprise a silver solder having a melting temperature of 610° C. The cross-sectional area of the composition 5 is designated A and its axial dimension h. The radius of the composition 5 is about 0.5 to 1 mm. shorter than the radius r. The following is an example of a suitable composition of the silver solder:

Cu 19%, Zn 13 to 19%, Ag 44 to 46%, Cd 18 to 22%.

FIG. 4 shows the solder metal stud 4, 5 being held above the aperture of the cable shoe. Upon application of the current, an arc is struck between the solder metal 5 at the forward end of the stud and the rail 3 and heat is transferred from the arc and from melted solder metal to the rail 3 and the cable shoe 2. When all the solder metal 5 has melted off, the stud 4 is forced into the aperture of the cable shoe and into the molten solder metal. Simultaneously, solder metal has flown outwardly under the cable shoe. The whole planar underside of the shoe and corresponding planar portions of the rail, therefore, form soldering surfaces which have to reach a temperature substantially higher than the melting temperature of the solder metal, i.e. 610° C., but should not reach the melting temperature of the cable shoe, which, in the case of copper, is 1085° C. To meet these requirements, it is necessary to maintain the heat dissipation from the soldering surfaces within determined limits. The dissipation of the rail 3 cannot be controlled to any noticeable extent, but this does not apply to the cable shoe, which should, therefore, according to the invention be proportioned to have a minimum volume according to the following formula:

$$W_{min.} = (k)(A) \frac{e^{(1+h^{1/3})}}{\log_e (K/100)}$$

and a maximum volume according to the formula:

$$W_{max.} = (k)(A) \frac{e^{(1+h^{1/3})}}{\log_e (K/100)} \cdot \log_e (K_1/100)$$

wherein, in each formula:

$W$ = the volume of the cable shoe in cm.$^3$,
$A$ = the cross-sectional area of the solder metal stud in cm.$^2$,
$h$ = the height of the solder metal stud in cm.,
$K$ = the melting temperature of the solder metal in degrees Kelvin,
$K_1$ = the melting temperature of the cable shoe in degrees Kelvin,
$k$ = a constant having the value of .2 in the case of silver solder; and
$e$ = the base of the natural logarithmic system.

Upon selection of a solder metal stud and a cable shoe of a certain material it is therefore a simple matter to insert the corresponding values in the above formulas and to ascertain the limits of the volume of the cable shoe. There remains a determination of the thickness of the cable shoe, but this is a simple matter, since it cannot very well be thinner than ⅛ of the diameter thereof in view of the required strength and it is not practical to make it thicker than ¼ of the diameter of the shoe in view of the length of the aperture of the shoe and the requirement for the arc not to reach the walls of the aperture but only the rail at the bottom thereof.

In view of these formulas, it is therefore easy to proportion the cable shoe so as to obtain a solid and dependable solder connection, since the cable shoe is given a suitable dimension of soldering surfaces in view of the mechanical strength requirements to be met and reaches a sufficient working temperature for bonding with the solder metal without the temperature being so high as to cause melting of the cable shoe. Furthermore, it is ensured that the solder surface of the rail reaches a sufficient temperature for the bonding of the solder metal owing to the diffusion taking place.

The circumference of the cable shoe 2 has been shown in the top view to be circular and concentric with the aperture, but it is obvious that it may also be of square or hexagonal shape etc. The cable 1 joins the cable shoe at its circumference and therefore dissipates some of the heat therefrom but this influence is so small that it is not necessary to take it into account when applying the formulas. The drawing shows only one cable shoe of a cable, but it is obvious that a complete rail contact device comprises a cable having a cable shoe at each end thereof, both of which are proportioned according to the above formulas. Even if there are two apertures and two soldering studs utilized for each cable shoe, the formulas may serve for the proportioning of the cable shoes.

It has been found that the preferable value of $k$ is dependent on the composition of the solder used. More particularly, it appears that the preferable value of $k$ is a function of the product of the specific heat and the specific gravity for the solder in question. However, since a solder is composed of several metals, this product has to be taken for each component separately and a "weighted" mean value is to be used, which is calculated with the proportions of the various components as weighting factors. If the weighted means value of the products is designated $M$, specific heat $h$, specific gravity $g$ and the quantity of a component $a$, then, in the case of three component metals designed by subscripts 1, 2 and 3, the value of $M$ would therefore be $$M = \frac{a_1 h_1 g_1 + a_2 h_2 g_2 + a_3 h_3 g_3}{a_1 + a_2 + a_3}$$

In the case of four different solders referred to as A, B, C and D the following table indicates the composition of the solder, its melting point and the value of $M$ as well as the preferable value of $k$ found. In the case of solder B it was found that the same value of $k$ as for solder A is a good approximation.

point of 610° C., a diameter of a 2.0 cm. and a height of 0.5 cm., a copper shoe having a melting point of about 1085° C. according to the present invention has a maximum volume of about 4.42 cm.$^3$ and a minimum volume of 1.73 cm.$^3$. Remembering that $2r$ is slightly larger than the diameter of the solder and assuming that the thickness $t$ of the shoe is ¼ of the radius $R$ (corresponding to ⅛ of the shoe diameter) then the shoe has a radium $R$ of about 1.6 cm. and a thickness of about 0.4 cm. to correspond with the minimum volume and a radius $R$ of about 2.0 cm. and corresponding thickness for maximum volume.

I claim:

1. A contact device for soldering to a metallic surface comprising a contact shoe having an aperture provided therein into which is inserted a metal stud having a cylinder of solder metal at its forward end, said contact shoe being proportioned to have a minimum volume according to the following formula:

$$W_{min.} = (k)(A) \frac{e^{(1+h^{1/3})}}{\log_e (K/100)}$$

and a maximum volume according to the following formula:

$$W_{max.} = (k)(A) \frac{e^{(1+h^{1/3})}}{\log_e (K/100)} \log_e(K_1/100)$$

wherein, in each formula:

$W$ = the volume of the cable shoe in cm.$^3$,
$A$ = the cross-sectional area of the solder metal stud in cm.$^2$,
$h$ = the height of the cylinder of metal in cm.,
$K$ = the melting temperature of the solder metal in degrees Kelvin,
$K_1$ = the melting temperature of the cable shoe in degrees Kelvin,
$k$ = a function of the product of the specific heat and the specific gravity of the solder metal; and
$e$ = the base of the natural logarithmic system.

2. A contact device according to claim 1 wherein $k$ has a value of from 0.2 to 0.26.

3. A contact device according to claim 1 wherein $k$ has a value of 0.20 and the solder is silver solder.

| Solder | Cu, Percent | Zn, Percent | Ag, Percent | Cd, Percent | Mn, Percent | Co, Percent | Ni, Percent | Melt. p., ° C. | M | k |
|---|---|---|---|---|---|---|---|---|---|---|
| A | 19 | 13–19 | 44–46 | 22 | 0 | 0 | 0 | 610 | 0.616 | 0.20 |
| B | 16 | 23 | 49 | 0 | 7 | 0 | 5 | 690 | 0.664 | (0.20) |
| C | 50 | 31 | 12 | 7 | 0 | 0 | 0 | 800 | 0.713 | 0.22 |
| D | 86 | 0 | 0 | 0 | 10 | 4 | 0 | 1,020 | 0.820 | 0.26 |

As a suitable approximation for the preferable value of $k$, it may be assumed that $k$ increases linearly from 0.20 to 0.26 when $M$ varies from 0.64 to 0.82.

For use with a silver solder metal having a melting

No references cited.

ARTHUR L. LA POINT, *Primary Examiner.*

R. A. BERTSCH, *Assistant Examiner.*